May 13, 1969     E. A. MACHA     3,444,403
SUBMERSIBLE MOTOR WITH STATOR LINER SUPPORT
Filed May 31, 1966
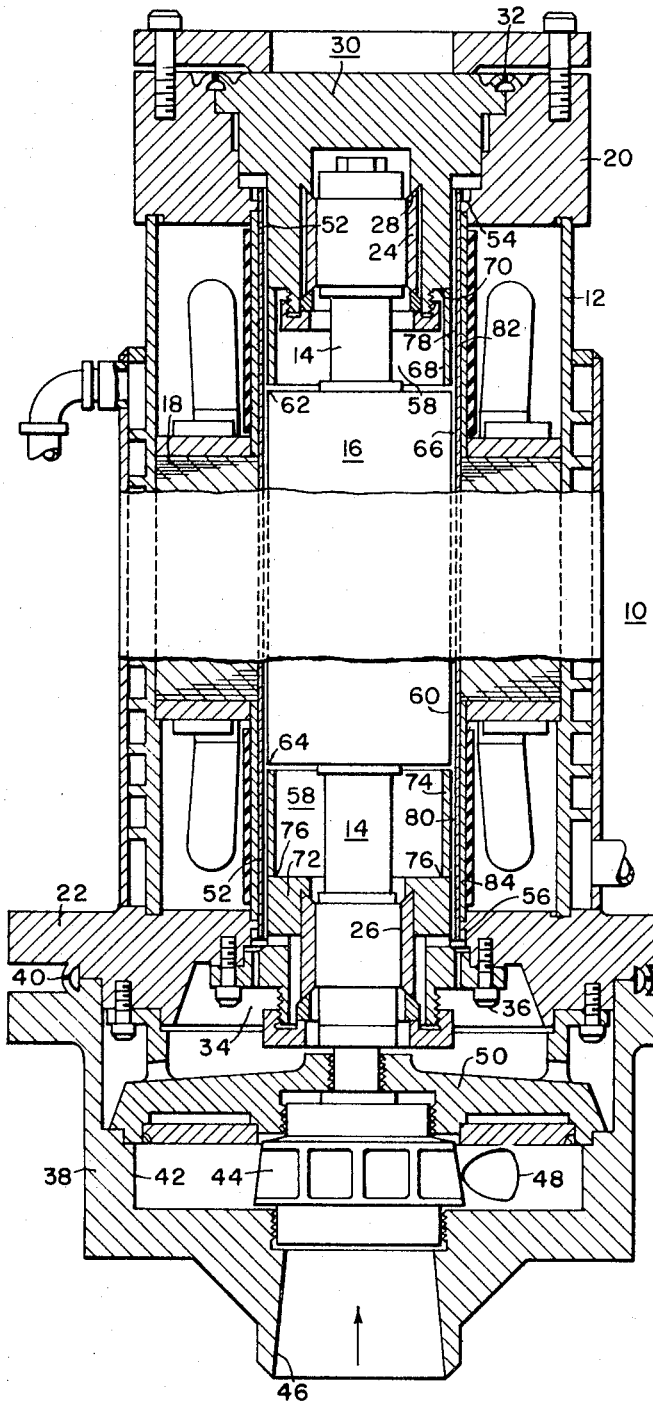
WITNESSES:
INVENTOR
Edward A. Macha
BY
ATTORNEY

United States Patent Office 3,444,403
Patented May 13, 1969

3,444,403
SUBMERSIBLE MOTOR WITH STATOR LINER SUPPORT
Edward A. Macha, Monroeville, Pa., assignor to Westinghouse Electric Corporation, Pittsburgh, Pa., a corporation of Pennsylvania
Filed May 31, 1966, Ser. No. 553,785
Int. Cl. H02k 5/10
U.S. Cl. 310—86
2 Claims

ABSTRACT OF THE DISCLOSURE

A hermetically enclosed motor having an annular flange telescopically disposed within each end portion of a stator enclosure can, the annular flanges extending toward and axially spaced from the end of the rotor, whereby the flanges and the rotor are substantially coextensive with the can for supporting the can against substantial radial inward contraction.

---

This invention relates to dynamoelectric machines and more particularly it pertains to such machines where the rotor chamber is separated from the stator chamber by a relatively thin enclosure or "can."

Motors of the type involved herein are frequently used to circulate a liquid through a closed system. As a result of such environment it is expedient to enclose the stator within a hermetically sealed container and to seal the stator chamber from the rotor chamber, the latter being exposed to environmental fluid of a hermetic system in which the motor is used.

In the course of normal operation of a canned motor, it is necessary from time to time to check the fluid system for leaks by draining the fluid from the system and the rotor chamber by the use of a vacuum. Also, under certain operating conditions, the system can be reduced to a very low pressure or vacuum. The combination of the vacuum and external pressure, if excessive, may cause the stator can to buckle or collapse radially inwardly and cause the ultimate failure of the motor.

Various methods have been considered for preventing the collapse of the stator can. An increase in thickness of the can is undesirable because of the loss of efficiency due to the greater power consumption. Moreover, materials having a higher moduli of elasticity also have correspondingly higher electrical resistance which also results in lower efficiency and greater power consumption. Accordingly, no material is readily available for use as hermetic seals for motors submerged in fluid systems, which will operate efficiently and which will not buckle or deform out of shape during periods of low system pressure.

It has been found that the foregoing problems and disadvantages may be overcome by the provision of a suitable back-up member which prevents that portion of the stator can axially beyond the motor air gap from buckling or collapsing radially inward to an excessive degree beyond the modulus of elasticity or yield point of the material, and which does not effect normal operation of the pump. The portion of the can within the motor air gap is prevented from said buckling by virtue of the same close clearance provided by this invention. The device of the present invention provides a motor pump which is capable of withstanding a vacuum of 30″ of mercury (15 p.s.i.) when applied to the inside of the hermetic seal or can of the stator for 100 or more occurrences.

Accordingly, it is an object of this invention to provide a motor construction which eliminates the modes of buckling or collapse of a hermetic seal or can which are of a permanent nature.

It is another object of this invention to provide a motor construction which limits the can deflection to a value that is less than the critical value for collapse.

It is another object of this invention to provide a motor construction which provides for the extension of upper and lower radially bearing housings which are concentrically disposed within the hermetic seal for limiting radially inward collapse of the stator can when the motor is subjected to resultant differential pressure with the higher pressure on the outside diameter of the can.

Finally, it is an object of this invention to satisfy the foregoing problems and desiderata in a simple and effective manner.

Briefly, the device of the present invention accomplishes the above cited objects by providing an annular flange telescopically disposed within each end portion of the stator can, and extending toward and axially spaced from the end of the rotor, whereby the flanges and the rotor cooperate along substantially the entire length of the can for supporting the can against substantial radial inward contraction.

The accompanying drawing is illustrative of the apparatus of the present invention.

In the drawing a motor pump unit is generally indicated at 10. It includes an outer housing 12 forming a stator chamber, a driven shaft 14, a rotor 16, and an annular stator 18. The upper end of the stator chamber is closed by a member 20 and the lower end is closed by a member 22.

The upper end of the shaft 14 is mounted within a sleeve bearing 24. Likewise, the lower portion of the shaft 14 is mounted within a sleeve bearing 26. The upper bearing is secured within a mounting recess 28 of annular shape which is disposed in a general mounting bracket 30 which is seated within the closure member 20 where it is sealed in place by an annular weld 32.

The lower sleeve bearing 26 is secured in place by mounting means generally indicated at 34 which is secured by space bolts 36 to the lower closure member 22.

At the lower end of the unit 10 a pump housing 38 is attached to the closure member 22 and is secured by an annular weld 40. The housing 38 provides a pump chamber 42 in which a pump impeller 44 is disposed on the lower end of the shaft 14. Accordingly, a liquid to be pumped enters the pump chamber 42 via an inlet 46 and exits the chamber through an outlet 48.

Because of the excessive heat of the liquid being pumped, a thermal barrier plate 50 is disposed within the housing 38 and below the closure member 22 to minimize the flow of heat from the pump chamber 42 to the motor section of the unit 10.

The stator chamber is hermetically sealed from the rotor chamber because the latter is exposed to the environmental liquid. For that purpose an elongated sleeve 52 is mounted within the stator 18 and extends between the upper closure member 20 and the lower closure member 22, where the ends of the sleeve are secured such as by welds 54 and 56, respectively. Thus, a hermetically sealed container is provided between the stator 18 and a rotor chamber 58 defined by the inner surface of the sleeve 52.

In a similar manner the rotor 16 may be hermetically sealed within a can or sleeve 60. The sleeve 60 is secured in a fluid-tight manner to the rotor 16 by, for example, welds 62 and 64 at the upper and lower ends thereof.

The cans or sleeves 52 and 60 are concentrically disposed with respect to each other and provide a clearance space 66 by which communication is made between the upper and lower portions of the chamber 58, the upper portion of which is generally disposed around the upper end of the shaft 14 and the lower portion of which is generally disposed around the lower portion of the shaft 14.

The mounting bracket 30 is provided with an annular flange or skirt-like member 68 which extends downwardly from the lower surface of the bracket top position closely adjacent yet spaced from the top of rotor 16 and which either is an integral part thereof, or may be secured by such means as an annular weld 70. Likewise, the mounting means 34 which includes a bearing mounting bracket 72 is provided with an annular flange or skirt-like member 74 extending upwardly to a position closely adjacent yet spaced from the bottom of rotor 16 and which is either an integral part of the bracket or is secured by such means as an annular weld 76.

The flanges 68 and 74 are substantially aligned with each other and are concentrically disposed with the can or sleeve 52, and spaced inwardly therefrom by clearance spaces 78 and 80, respectively. The clearance spaces are substantially equal to or less than the space 66 between the rotor can 60 and the stator can 52.

During operation of the motor pump unit 10, the motor chamber 58 which includes the clearance spaces 66, 78, and 80 is subjected to an interior pressure which acts upon the inner surface of the can or sleeve 52 without damage. From time to time, however, the unit 10 is shut down for maintenance or other purposes and to completely drain the unit, a vacuum is applied which pulls all fluids out of the rotor chamber and creates a partial vacuum therein. Under certain conditions of system operation, said vacuum can also exist. As a result of the vacuum the thin walled can or sleeve 52 may be moved away from the surrounding outer-supporting surfaces such as a back-up sleeve 82 and a back-up sleeve 84 at the upper and lower ends of the can or sleeve 52.

In addition, the central portion of the can or sleeve 52 may be pulled away from the inner wall of the stator 18 and against the outer wall of the can or sleeve 60 of the rotor 16. Excessive partial vacuums cannot create permanent deformation of the can or sleeve 52 due to the presence of the rotor 16 and the flanges 68 and 74 at the upper and lower ends of the rotor 16. The flange 68 extends between the mounting bracket 30 and the upper end of the rotor 16 to prevent the thin walled can or sleeve 52 from being pulled into the motor chamber to such an extent that it is permanently buckled or deformed. Similarly, the lower flange 74 extends between the bracket 72 and the lower end of the rotor 16 to prevent excessive buckling or deformation of the thin walled can or sleeve 52 into the lower portion of the motor chamber 58.

Accordingly, the flanges 68 and 74 prevent the can 52 from collapsing when subjected to a partial vacuum within the motor chamber and obviate the necessity of providing a material having a greater thickness or a higher modulus of elasticity, both of which result in a motor having a greatly lowered operating efficiency.

It is understood that the above specification and drawing are merely exemplary and not in limitation of the invention.

What is claimed is:

1. A hermetically enclosed motor comprising an outer housing, an annular stator within the housing, a motor shaft, a rotor on an intermediate portion of the shaft, a hermetically sealing sleeve enclosing the inner surface of the stator and forming a rotor chamber coextensive with the sleeve, the sleeve having end portions extending beyond the rotor, the shaft having opposite end portions extending from the rotor and through the rotor chamber, the portions of the rotor chamber and opposite ends of the rotor being communicative through a clearance space between the rotor and the sealing sleeve, each end of the rotor chamber being closed by a mounting bracket, the end portions of the motor shaft being journally mounted in corresponding mounting brackets, means for supporting the sleeve against substantial inward radial contraction and including a cylindrical sleeve mounted on and extending axially from each mounting bracket toward the rotor, and the cylindrical sleeve having a diameter slightly less than that of the sealing sleeve and forming therewith a second clearance space between the sleeves which space is coextensive with the cylindrical sleeve and communicates with the rotor chamber, whereby the sealing sleeve is exposed to a coolant within the rotor chamber.

2. The motor construction of claim 1 in which the cylindrical sleeves are axially aligned with the outer periphery of tne rotir.

References Cited

UNITED STATES PATENTS

| | | | |
|---|---|---|---|
| 2,310,422 | 2/1943 | Gold | 310—86 |
| 2,730,636 | 1/1956 | Dunn | 310—86 |
| 2,996,632 | 8/1961 | Ward et al. | 310—86 |
| 3,053,189 | 9/1962 | White | 103—87 |
| 3,128,712 | 4/1964 | Sence | 103—87 |
| 3,192,861 | 7/1965 | Haegh | 103—87 |

WARREN E. RAY, *Primary Examiner.*

U.S. Cl. X.R.

310—87